(No Model.)
A. H. COBLE.
CARPET STRETCHER.
No. 328,653. Patented Oct. 20, 1885.
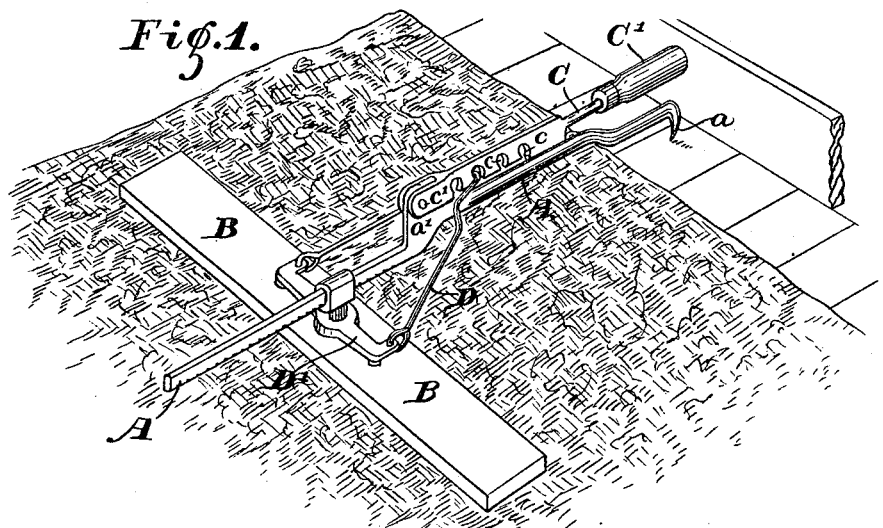
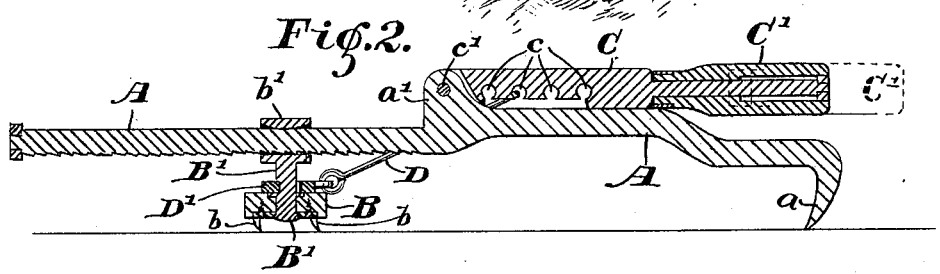
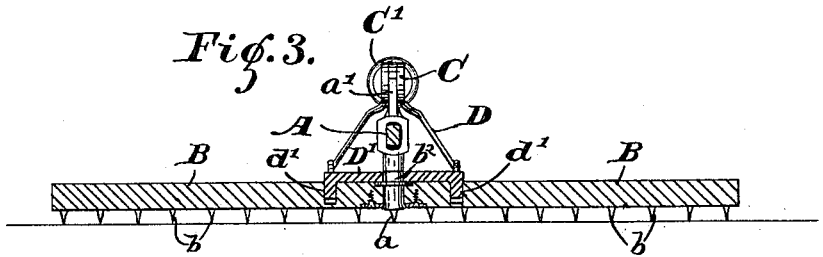
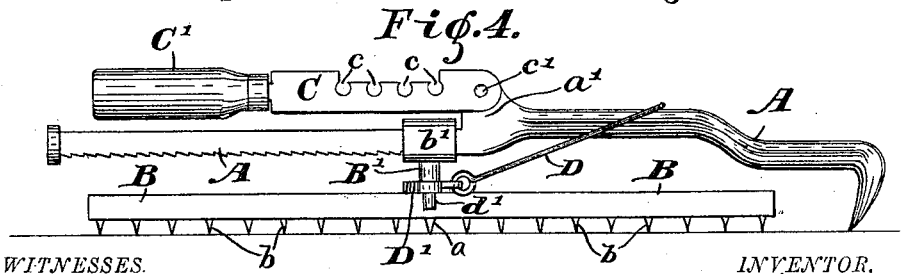
WITNESSES.
Chas N. Leonard,
E. W. Bradford.
INVENTOR.
Albert H. Coble,
PER
C. Bradford
ATTORNEY.

United States Patent Office.

ALBERT H. COBLE, OF FRANKFORT, INDIANA.

CARPET-STRETCHER.

SPECIFICATION forming part of Letters Patent No. 328,653, dated October 20, 1885.

Application filed June 20, 1885. Serial No. 169,267. (No model.)

*To all whom it may concern:*

Be it known that I, ALBERT H. COBLE, of the city of Frankfort, county of Clinton, and State of Indiana, have invented certain new and useful Improvements in Carpet-Stretchers, of which the following is a specification.

My said invention relates to that class of devices known as "carpet-stretchers;" and it consists of a floor-hook and main bar constructed in one piece, a carpet-hook mounted on said bar, a bail or catch pivoted to said carpet-hook, and a lever pivoted to the bar and provided with notches with which said bail will engage, as will be hereinafter more particularly described.

Referring to the accompanying drawings, which are made a part hereof and on which similar letters of reference indicate similar parts, Figure 1 is a perspective view of a carpet-stretcher in use embodying my said invention; Fig. 2, a longitudinal vertical section of said stretcher; Fig. 3, a transverse vertical section on the dotted line 3 3, and Fig. 4 a side elevation in the position which it occupies when folded up.

In said drawings the portions marked A represent the main bar of the stretcher; B, the carpet-hook; C, the lever, and D the bail. The bar A is a metallic bar provided upon one end with a floor-hook, $a$, the other end serving as a slide on which the carpet-hook is moved, and has pivot bearings $a'$ for the lever. It is also notched or serrated upon its under side, and the slide thereon is adapted to engage therewith and be locked thereby from moving back while in use. The carpet-hook B is in the form of a bar having numerous hooked projections $b$, which are adapted to engage with the carpet, as shown. This bar is mounted at its center upon a pivot, B', projecting downwardly from a slide, $b'$, which encircles the bar A, and is thus guided in its movements by said bar. Said pivot B' has a notch, $b^2$, with which the base D' of the bail D engages when the device is in use, and is thus kept from coming out of engagement with the carpet-hook, as will be understood on inspection of Fig. 3. The lever C is secured by a pivot, $c'$, to the pivot-bearing $a'$ on the bar A, and is provided with several notches, $c$, upon one side, (which is preferably the under side when the handle is turned in the direction toward which the carpet is being drawn, and the upper side when the handle is thrown back toward said carpet, as shown.) In order to give a greater amount of leverage when the handle is in the position which requires the most leverage, and still bring it within the length between its pivot-point and the floor-hook when folded down, the outer portion of the handle C' is preferably made slidable upon the main part C, thus making this an extension-lever. The bail D is secured at each end to points on either side of the center of the carpet-hook, as shown; and extends forward, and is adapted to engage with the notches in the lever at its central portion, and serves as a connection by which said lever is adapted to operate upon and draw up the carpet-hook.

In order that the device may be folded up into a more convenient condition to be carried about, the bail, instead of being directly connected to the bar of the carpet-hook, is connected to a separate bar or base, D', which is mounted upon the pivot B', and which extends out a short distance each way from said pivot, as shown; and this bar is provided with the locking-pins $d'$, which enter holes in the top of the carpet-hook, and thus lock said carpet-hook in line therewith, the notch $b^2$ in the rear side of the pivot B' serving to hold the base D' down into engaged position, when the stretcher is in condition for use.

When it is desired to turn the carpet-hook into line with the bar, and thus bring the device into more convenient condition for transportation, this base D' is pushed back out of the notch $b^2$ in the pivot B' and raised up on said pivot until the locking-pins $d'$ are freed from the holes in the bar of the carpet-hook, when said carpet-hook can be swung around on said pivot to a point at right angles with its former position, and thus bring all the larger parts of the device substantially into line, thus considerably reducing its bulk, as shown in Fig. 4.

The operation is as follows: The device being in position for use, the floor-hook $a$ is first driven into the floor, as is usual. The carpet-hook is then engaged with the carpet at the proper point. The bail D is then brought into engagement with one of the notches in the lever C, and the lever thrown over toward the floor-hook. As the lever reaches its extreme position the bail passes below the pivot on which the lever is mounted, and thus the device is automatically locked in position until the carpet can be secured. After the carpet has been drawn up by means of this device, when the bail is in one of the notches of the lever if it is not sufficiently tight it can be thrown back and the engagement made with another notch without disturbing the engagement of the carpet-hook with the carpet. The device is held in position while the change is being made by the corner of the slide $b'$ engaging with one of the notches in the under side of the bar A, it being permitted by its construction (see Fig. 2) to tip slightly for this purpose.

Having thus fully described my said invention, what I claim as new, and desire to secure by Letters Patent, is—

1. The combination, in a carpet-stretcher, of a main bar having a floor-hook, a carpet-hook slidably mounted thereon, a lever pivoted at its lower end to said bar and provided with notches in its edge, and a bail or catch attached to said carpet-hook at one end and adapted to engage with said notches in said lever at its other end, whereby the parts may be secured in the desired position, substantially as set forth.

2. The combination, in a carpet-stretcher, of the main bar, a carpet-hook, a sliding pivot upon which said carpet-hook is mounted, and a lock secured to said pivot and adapted to engage with said carpet-hook or be disengaged therefrom, substantially as shown and described, and for the purposes specified.

3. The combination, in a carpet-stretcher, of the main bar, the carpet-hook, a lever for operating the carpet-hook, and a connection from the carpet-hook to the lever, said lever being provided with a freely-sliding extensible handle, substantially as set forth.

4. The combination, in a carpet-stretcher, of of a main bar, a slide on said bar, a carpet-hook pivoted on said slide, a lever pivoted to said bar, a bail or catch, and a bar having locking-pins pivoted upon said slide to which said bail or catch is secured, substantially as set forth.

5. The combination, in a carpet-stretcher, of a main bar provided with a floor-hook at one end and a slide at the other and having serrations in one side of the portion over which said slide moves, a carpet-hook pivoted on said slide, a lever pivoted to said bar between said carpet-hook and said floor-hook, and a connection between said carpet-hook and said lever, substantially as set forth.

6. The combination, in a carpet-stretcher, of a main bar, a lever pivoted thereto, a combined slide and pivot thereon, the pivot portion of said slide being notched on its rear side, a carpet-hook on said pivot portion, a connection between said carpet-hook and said lever, the base whereof is also pivoted on the pivot portion of said slide, and adapted also to serve as a lock to hold the carpet-hook in position, being itself held into engagement with said carpet-hook by the notch in the pivot portion of the slide, substantially as set forth.

In witness whereof I have hereunto set my hand and seal, at Indianapolis, Indiana, this 17th day of June, A. D. 1885.

ALBERT H. COBLE. [L. S.]

Witnesses:
C. BRADFORD,
CHARLES L. THURBER.